United States Patent [19]

Takahashi et al.

[11] 4,024,219

[45] May 17, 1977

[54] PROCESS FOR REMOVING NITROGEN OXIDE FROM A WASTE GAS

[75] Inventors: Naoyuki Takahashi, Hiroshima; Nobuaki Murakami, Nagasaki, both of Japan

[73] Assignee: Mitsubishi Jukogyo Kabushiki Kaisha, Tokyo, Japan

[22] Filed: Aug. 14, 1975

[21] Appl. No.: 604,763

[30] Foreign Application Priority Data

Aug. 21, 1974 Japan .................... 49-94981

[52] U.S. Cl. ............... 423/235; 423/400; 423/396

[51] Int. Cl.² ................... C01B 21/00

[58] Field of Search .......... 423/235, 239, 400, 402; 55/69

[56] References Cited

UNITED STATES PATENTS

| | | | |
|---|---|---|---|
| 1,391,332 | 9/1971 | McKee | 423/402 |
| 3,079,232 | 2/1963 | Andersen et al. | 423/402 |
| 3,389,961 | 6/1968 | Sundaresan et al. | 423/239 |
| 3,428,414 | 2/1969 | Baum et al. | 423/235 |
| 3,453,071 | 7/1969 | Schmitt et al. | 423/235 |

FOREIGN PATENTS OR APPLICATIONS

| | | | |
|---|---|---|---|
| 669,791 | 2/1929 | France | 423/400 |
| 47-15448 | 5/1972 | Japan | 423/400 |
| 569,687 | 6/1945 | United Kingdom | 423/400 |

OTHER PUBLICATIONS

Chem. Abstr. 9534, 1958, vol. 52.
Chem. Abstr. 13204(b), 1958, vol. 52.
Ind. J Eng. Chem., vol. 52, No. 12, Dec. 60, pp. 1011–1014, Reactions of Aqueous $NO_2$, Kovac et al.

Primary Examiner—Edward J. Meros
Assistant Examiner—Eugene T. Wheelock
Attorney, Agent, or Firm—Cushman, Darby & Cushman

[57] ABSTRACT

A process for removing nitrogen oxide contained in a waste gas is disclosed which includes oxidizing the nitrogen oxide to nitrogen dioxide by mixing the gas with nitric acid vapor in the presence of porous adsorbing agent such as silica gel, colloid earth, alumina, molecular sieves or the like and removing the nitrogen dioxide by absorption with an alkali aqueous solution.

6 Claims, 1 Drawing Figure

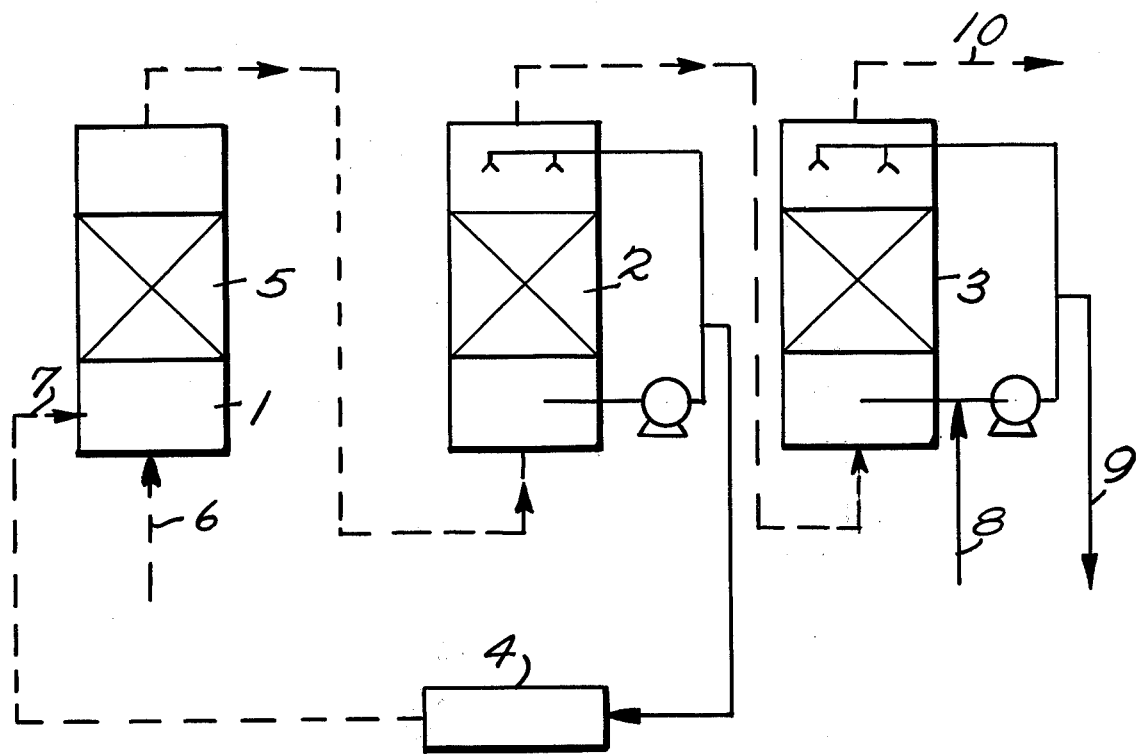

PROCESS FOR REMOVING NITROGEN OXIDE FROM A WASTE GAS

BACKGROUND OF THE INVENTION

The present invention relates to a process for the efficient removal of nitrogen oxide ($NO_x$) from a waste gas using an adsorbing substance.

There are already several processes under development or in actual use for removing nitrogen oxide waste or exhaust gases such as from a boiler, electric generating facility or the like. These gases consist mainly of nitrogen oxide and contain small amounts of nitrogen dioxide. The processes are conveniently characterized as either a dry contact reduction process or a process of wet absorption removal. In both of these processes, due to low reactivity and relatively low concentrations of nitrogen oxide in the waste gas — concentrations normally of about 100–900 ppm — it has in the past been difficult to find an economical manner for nitrogen oxide removal. Concentrated efforts in this technology are being continued. Nitrogen oxide is an acknowledged air pollutant and considerable efforts have been undertaken to effect substantial removal of this source of pollution from fossil fuel combustion.

The known dry contact reduction process is a process which includes reacting the nitrogen oxide present in the waste gas with a reducing agent in a catalyst layer which consists of a metal or metal compound to selectively or nonselectively reduce the nitrogen oxide to a form of nitrogen which is pollution-free. Illustrative reducing agents include ammonia and hydrogen sulfide for selective reduction and hydrogen, methane and carbon monoxide for nonselective reduction. This process has distinct disadvantages including the requirement of a high operational temperature of above 300° C for the reaction, reduction of the life of the catalyst due to the presence of sulfurous acid gases and requiring the additional treatment of an excess reducing agent in order to prevent pollution. In fact, in the event the reduction reaction is incomplete, there is a possibility that nitrous oxide is directly discharged. Also, an increased loss of pressure of the gas may occur due to blocking of the catalyst layer due to dust in the water gas. Many of these problems could be overcome if a reducing agent which would be operable at gas temperatures of about 50°–70° C after dust collection and desulfurization, that is, wet removal of sulfurous acid gas, of the waste gas can be found. Thus, the process of dry contact reduction would be considered an industrially effective process. But such catalyst has not yet been developed.

There are also various processes of wet absorption removal including converting nitrogen oxide (NO) into a nitric acid ion ($NO_3^-$) using an oxidizable solution and absorbing the ion into the solution, and a process for oxidizing NO to nitrogen dioxide, which is more reactive than NO, in a gaseous phase and thereafter absorbing $NO_2$ in an appropriate absorbing liquid such as an alkaline solution to remove $NO_2$.

As an example of the nitric acid ion conversion a process using a mixed solution of potassium permanganate and caustic soda is illustrative, but this process has drawbacks in that such an absorbing liquid is expensive and further a waste liquid containing nitric acid is difficult to properly treat for disposal. A process using hydrogen peroxide has many the same drawbacks in addition to the fact that an effective oxidizing amount of the hydrogen peroxide is relatively small due to self-decomposition.

With respect to oxidizing nitrogen oxide to nitrogen dioxide several oxidizing agents such as ozone, chlorous acid and a nitric acid solution have been proposed. However all of these procedures have their own disadvantages in that the cost of equipment and the cost of electrical power are very expensive (for the ozone process), the price of the oxidizing agent itself is fairly high and the resulting waste liquid must be treated (as with the chlorous acid process), and the reactivity is low when the concentration of nitric acid is 40°–60% by weight, the reaction temperature is 40°–70° C and it is difficult to protect the operating apparatus from corrosion (as in the nitric acid solution process). Another proposal was using a solution of ferrous sulfate in absorbing nitrogen oxide in the form of a nitrogen monoxide complex but such a process has not proven to be practical either.

DETAILED DESCRIPTION OF THE INVENTION

The present invention relates to a process for removing nitrogen oxide from a waste gas which comprises oxidizing the nitrogen oxide present in the waste gas to nitrogen dioxide by adding to the waste gas nitric acid vapor in the presence of an adsorbing agent such as silica gel, colloid earth, alumina and molecular sieves, then removing the nitrogen dioxide by absorbing it with an aqueous alkali solution. As discussed in more detail below this process uses to advantage the fact that the rate of reaction of nitrogen oxide with nitric acid in the gaseous phase — which is very slow at a temperature ranging from 40° to 140° C — is promoted to a high reaction rate so as to be sufficient for treating such low concentrations of nitrogen oxide as are typically found in waste gases. This is believed to be due primarily to the presence of the adsorbing substance.

There are several operating parameters that we have found to be advantageous when carrying out the process of our invention. It is generally preferable, but not necessary as illustrated in Example 1 below, to use an excess amount of nitric acid vapor in the oxidizing column 1, which is then removed, when present, in nitric acid absorbing column 2. The time required for oxidation in column 1 is generally expressed in terms of space velocity and is generally of the order of about 100 to 10,000 $hr^{-1}$ and preferably from about 2,000 to 6,000 $hr^{-1}$. The oxidation step of the process is usually conducted at reaction-promoting temperatures in the range of about 50° C to about 150° C and preferably from about 60° C to about 80° C. Conveniently, the temperature of the oxidation reaction is conducted at or about the temperature at which the preliminary desulfurization treatment is carried out such that adjustment of the temperature of the desulfurized waste gas is not necessary.

Various adsorbing agents are used in the oxidation colum 1 including alumina, silica gel, molecular sieves and colloidal earth; silica gel is preferred. These adsorbing agents are optionally supported by an inert filler or supporting agent, such as glass wool. Other adsorbing agents and optionally suspending agents may be used.

The invention is further explained and illustrated by the attached flow diagram (not to scale) which is but one embodiment of an apparatus for practicing the present invention. The apparatus contains an oxidation zone and an absorption zone as is explained below.

Referring now to the flow diagram, the exhaust gas or waste gas from a source of combustion of fuel, such as a boiler, internal combustion engine or the like, containing nitrogen oxide and sulfur oxide, is first subjected to conventional dust collection and desulfurization procedures (not shown) and thereafter introduced into an oxidation column 1 via line 6. Nitrogen oxide in the oxidation column is oxidized to nitrogen dioxide (which is more reactive than nitrogen oxide) by nitric acid vapor injected from a line 7 which is positioned on the side surface of the column 1 in the general vicinity of the bottom of column 1 which contains a layer of an adsorbing agent such as silica gel.

There are several sources for producing nitric acid vapor, for example, heating a solution of nitric acid at a normal concentration of 10–60% by weight and at a temperature above the boiling point of nitric acid, that is, about 120–150° C in a nitric acid concentrator-vaporizer 4. At this temperature the heat decomposition speed, that is the temperature at which the nitric acid is decomposed to nitrogen dioxide, water and oxygen by heat, of nitric acid is slow so it is convenient to obtain nitric acid vapor completely free from or substantially free from nitrogen dioxide provided the residence time of the nitric acid is properly controlled. Preferably the vessels and lines containing the nitric acid vapor or solution are constructed of a nitric acid-resistant material such as non-cast steel or the like.

It is well recognized that nitric acid is a strong oxidizing agent and its reaction with nitrogen oxide in the gaseous phase, illustrated by an overall reaction equation, is as follows:

$$NO + 2HNO_3 \rightarrow 3NO_2 + H_2O \qquad (1)$$

While the exact nature of this reaction is not presently clear, it is known that at a temperature below 20° C, even if the reaction is a considerably fast heterogeneous phase reaction, adsorption to the wall of the reactor itself constitutes a large primary factor. When the chemical equilibrium of the equation (1) is calculated, even in the presence of 10% moisture (water) as in the case of a typical waste gas, the equilibrium of the reaction favors production.

An example of oxidation tests of nitrogen oxide by nitric acid vapor that we have conducted is shown in Table 1.

As the table illustrates when an adsorbing substance such as silica gel is not used the adsorbing capability to the wall of the reactor declines and thus the reaction is very slow at a temperature of about 60° C. Even if about 11,000 ppm of nitric acid is used to treat 230 ppm of nitrogen oxide at most only 55% of an oxidation ratio is achieved. These observations are discussed by way of comparative examples reported in Table 1.

In treating a waste gas from a boiler, or the like, one should not rely on the temperature of the reaction of equation (1) for it is not economically profitable to lower the temperature from 50–60° C, which is the temperature of waste gas after desulfurization, to 20° C in order to optimize nitrogen oxide conversion. On the other hand, we have found that when a substance having a large adsorbing capability silica gel is used in the nitric acid gas treatment zone and proper operational conditions such as space velocity and the like are employed, it is then possible to obtain a high oxidation ratio with only a small amount of excess nitric acid even at a temperature of 50–140° C. As described herein silica gel may be used alone, that is without nitric acid fumes, as an oxidizing and adsorbing agent for nitrogen oxide, however, as is already known the action of silica gel on the overall reaction is itself very small. In order to optimize efficiency, dry cooling of the waste of a gas by removing moisture and a large amount of an adsorbing agent are required for treating a waste gas. In conducting tests using only silica gel we have found that the nitrogen oxide was not decreased.

As discussed above, we have observed that the fast reaction at a relatively low temperature of nitric acid with nitrogen oxide is caused by the adsorbing property of the wall of the reactor. From this point we have observed that when a material having a large adsorbing capacity such as silica gel is used waste gases from a boiler or the like can be treated even at the appropriate temperature range of about 50–150° C. As will be recognized other adsorbing substances besides silica gel may be used. Illustrative, but not limiting, examples include alumina, colloidal earth and molecular sieves or a catalyst of an active body supported by these substances.

Referring again to the flow diagram the nitrogen oxide which is oxidized to nitrogen dioxide in the oxidation column 1 is next treated in a nitrogen dioxide adsorbing column 3 by a conventional process using an aqueous alkaline solution, such as sodium sulfite, supplied via line 8. The waste gas thus treated to remove the pollutants of sulfur and nitrogen oxide is discharged into the atmosphere from a chimney (not shown) via line 10. According to the embodiment illustrated, in the event that the concentration of excess nitric acid in the waste gas being treated is so high as to obstruct the treatment and removal of nitrogen dioxide, a nitric acid vapor absorbing column 2 is optionally provided upstream from the nitrogen oxide absorbing column 3. Conveniently water is passed downwardly over an upward flow of nitric acid rich exhaust gas, as illustrated diagramatically in the drawing. When water is used as the absorbing solution in column 2, absorption of the nitric acid vapor is rapid and convenient, while the nitrogen dioxide is barely absorbed. Nitric acid vapor, which is an oxidizing agent for nitrogen oxide, may be recycled and prepared for reuse by concentrating and vaporizing in the nitric acid concentrator/vaporizer 4 as described above. The solution in which the nitric acid vapor is absorbed obtained from the nitric acid vapor absorbing column 2 is used to supply concentrator/vaporizer 4. Also a nitric acid solution is obtained from the dissolved concentrated nitrogen dioxide passing through line 9 from the nitrogen dioxide absorption column 3. When nitrogen dioxide is absorbed by sodium sulfite the concentrated nitrogen dioxide is obtained by adding an inorganic acid such as sulfuric acid to the absorbed solution. The nitric acid is obtained by absorbing the concentrated nitrogen dioxide by water. As a practical matter this means that nitric acid is necessary only at start-up of the process but, owing to the recycle procedures described above additional nitric acid is generally not required to continue operating the process, although small additional amounts of nitric acid may be needed from time to time. This feature makes the novel process described herein most economical when compared, for instance, to other oxidizing agents such as oxone, chlorous acid, potassium permanga nte and the like that are very expensive.

The process of the present invention, that is a process of oxidation, absorption and removal of nitrogen oxide using nitric acid vapor and an adsorbing substance such as silica gel has several advantages including (1) since nitrogen oxide is oxidized to nitrogen dioxide and then absorbed, the percentage of nitrogen oxide removed (efficiency) is high; (2) the reaction of nitrogen oxide with nitric acid is substantially promoted in the presence of a relatively simple adsorbing substance, such as silica gel, and the nitrogen oxide is oxidized in a relatively small reactor with a small amount of excess nitric acid; (3) treatment of excess nitric acid is convenient; and (4) when the treatment following the absorption of nitrogen dioxide is properly carried out, the supply of nitric acid which is an oxidizing agent from a source outside of the system is entirely unnecessary except at the time of start-up of the system which is economical. Of course there is a substantial industrial use for such a process as described herein.

The present invention is further illustrated by the following examples:

EXAMPLE 1

The following is descriptive of tests conducted in accordance with the attached drawing. The composition expressed in parts (percentage) by weight and flow velocity expressed in N liters/minute of the waste gas to be treated were as follows:

| Composition of a waste gas | |
|---|---|
| NO | 115 ppm |
| $O_2$ | 3% |
| $H_2O$ | 15% |
| Flow velocity of the waste gas | 1.05 N liter/min. |

The three steps of oxidation of the nitrogen oxide contained in the waste gas by contact with nitric acid vapor column 1, absorption of any excess nitric acid vapor with water in column 2 and absorption of the removed nitrogen dioxide by an alkali aqueous solution in column 3 were carried out using columns each having a diameter of 2 cm and a height of 50 cm. 30 ml (SV=2100 hr$^{-1}$) of silica gel was supported by glass wool and packed in oxidation column 1. For preparing the nitric acid vapor oxidizing agent a 60% aqueous solution of nitric acid was maintained at 25° C, into which 0.125 liter/min of a nitrogen carrier gas was passed to produce nitric acid having a concentration corresponding to the vapor pressure and supplied to the oxidation column 1. Excess nitric acid vapor was absorbed and recovered with a 5% aqueous solution of nitric acid in the nitric acid vapor absorbing column 2 and in the nitrogen dioxide absorbing column 3, an aqueous solution of sodium sulfite was used for recovering nitrogen dioxide.

According to this example, at an oxidation temperature of 72° C, the concentration of nitrogen oxide (NO) at the input of column 1 via line 6 was 115 ppm, as indicated, and the concentration of nitrogen oxide (NO + $NO_2$) at the discharge of the treatment steps at line 10 was between 10–15 ppm. The concentration of excess nitric acid vapor at the entrance of the nitric acid vapor absorbing column 2 was zero thus absorbing column 2 was, for practical purposes unnecessary. The concentration of nitrogen dioxide at the entrance of the nitrogen dioxide absorbing column 3 was 310 ppm.

EXAMPLES 2–4

Using waste gases having concentrations of nitrogen oxide shown in the following table, tests were carried out using the same apparatus under the same conditions as in Example 1, except for variation of the oxidation temperatures and space velocities as shown in the following table. The results together with comparative examples were shown in the following table.

| | NO at the entrance of Column 1 (ppm) | $HNO_3$ vapor at the entrance of Column 2 (ppm) | Oxidation temperature (° C) | No +0 $NO_2$ at the discharge of Column 3 (ppm) | Oxidation ratio (% Conversion) | Remarks | | |
|---|---|---|---|---|---|---|---|---|
| Comparative Example 1 | 236 | 11,000 | 60 | 105 | 55 | No silica gel | Oxidation time | 11 sec |
| Comparative Example 2 | 180 | 630 | 100 | 160 | 12 | " | " | 28 sec |
| Comparative Example 3 | 210 | 0 | 70 | 210 | 0 | Packed with silica gel | Space velocity | 6000 hr$^{-1}$ |
| Example 2 | 210 | 630 | 80 | 60 | 72 | " | " | 6000 hr$^{-1}$ |
| Example 3 | 210 | 630 | 70 | 20 | 90 | " | " | 3000 hr$^{-1}$ |
| Example 4 | 210 | 740 | 70 | 10 | 90 | " | " | 2000 hr$^{-1}$ |

The comparative examples illustrate that in the case of no silica gel in oxidation column 1 and using an extremely high concentration of nitric acid in the column, which is reflected in the high concentration of nitric acid vapor fed into column 2, only a partial decrease in the nitrogen oxide and nitrogen dioxide discharge from column 3 (55%) was observed (comparative Example 1). When the temperature of the oxidation step is increased to 100° C only a slight (20 ppm) reduction in the nitrogen oxide and nitrogen dioxide discharge is observed and conversion drops to 12% (comparative Example 2). In both cases the treatment time is quite lengthy (11–28 seconds). In comparative Example 3 the speed of the attempted reaction was increased to a space velocity of 6,000 hr$^{-1}$. Even with packed silica in the column there was no reduction in the amount of nitrogen oxide and nitrogen dioxide removed from the waste gas. Examples 2–4, according to the present invention, indicate a substantial, and in the case of Examples 3 and 4 a nearly complete (90%), reduction in the amount of nitrogen oxide and nitrogen dioxide present in the treated and discharged waste gas.

EXAMPLE 5

A waste gas having the same composition as in Example 1 was treated by the same apparatus under the same conditions as in Example 1, except for using colloidal earth and molecular sieves as the adsorbing substance. The results show that starting with 115 ppm of nitrogen oxide (NO) at the entrance of column 1 the combined concentration of nitrogen oxide (NO + $NO_2$) at the discharge of column 3 was 15 ppm for the colloidal earth and 63 ppm for the molecular sieves.

What is claimed is:

1. A process for removing nitrogen monoxide from a waste gas containing relatively low concentrations of said nitrogen oxide comprising the successive steps of (a) contacting the nitrogen oxide containing waste gas with a molar excess of nitric acid vapors in an oxidation column at a temperature of about 50° to about 150° C in the presence of a porous adsorbing agent selected from the group consisting of silica gel, alumina, colloidal earth and molecular sieves, thereby oxidizing the nitrogen oxide to nitrogen dioxide, (b) contacting the thus treated waste gas with a countercurrent of water to remove the excess nitric acid therefrom while the nitrogen dioxide remains in the waste gas, (c) contacting the nitrogen dioxide-containing waste gas with an aqueous alkaline solution to absorb and remove the nitrogen dioxide contained therein, and (d) discharging the thus treated waste gas substantially freed of nitrogen dioxide into the atmosphere.

2. The process of claim 1 wherein the nitric acid recovered in step (b) is concentrated and recycled to oxidization step (a).

3. The process of claim 1 wherein oxidization step (a) is conducted at a temperature of about 60° to about 80° C.

4. The process of claim 1 wherein the adsorbing agent is suspended in the oxidation column for contact with the nitric acid vapors.

5. The process of claim 1 wherein the oxidation step (a) is conducted at a space velocity of about 2,000 to about 6,000 $hr^{-1}$.

6. The process according to claim 1 wherein the adsorbing agent is silica gel.

* * * * *